Sept. 19, 1944.    J. E. ROSECKY    2,358,418
MACHINE AND A PROCESS FOR MAKING SUGARED MILK POWDER
Filed Nov. 12, 1941    2 Sheets-Sheet 2
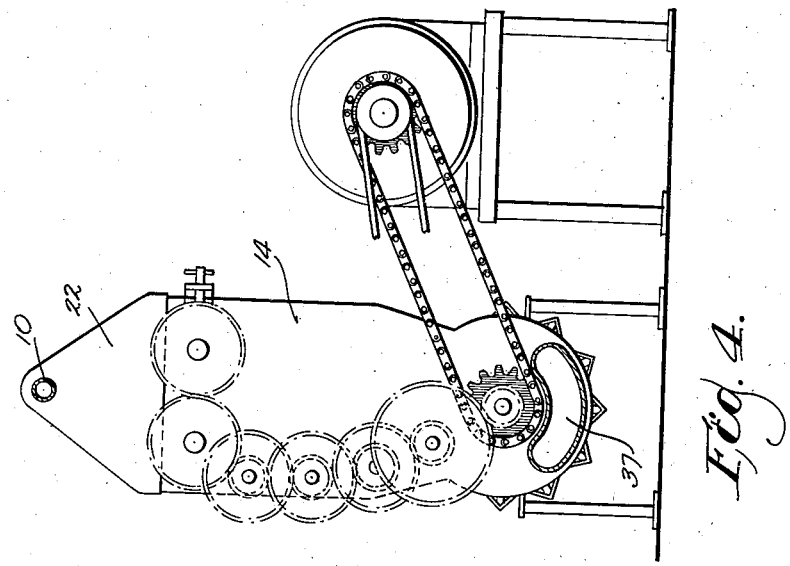
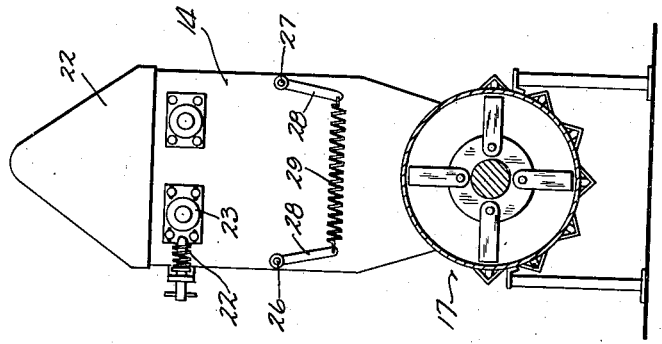
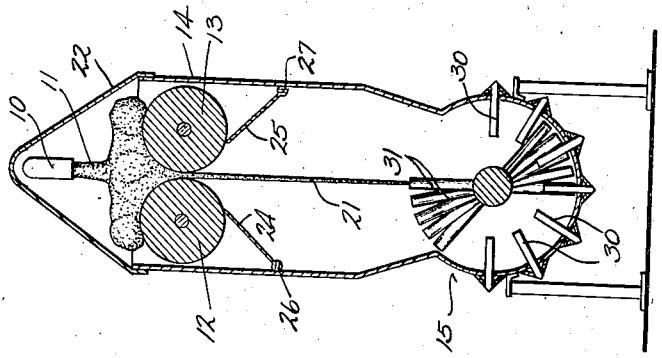
INVENTOR
JOSEPH E. ROSECKY
BY
Wheeler, Wheeler & Wheeler
ATTORNEYS.

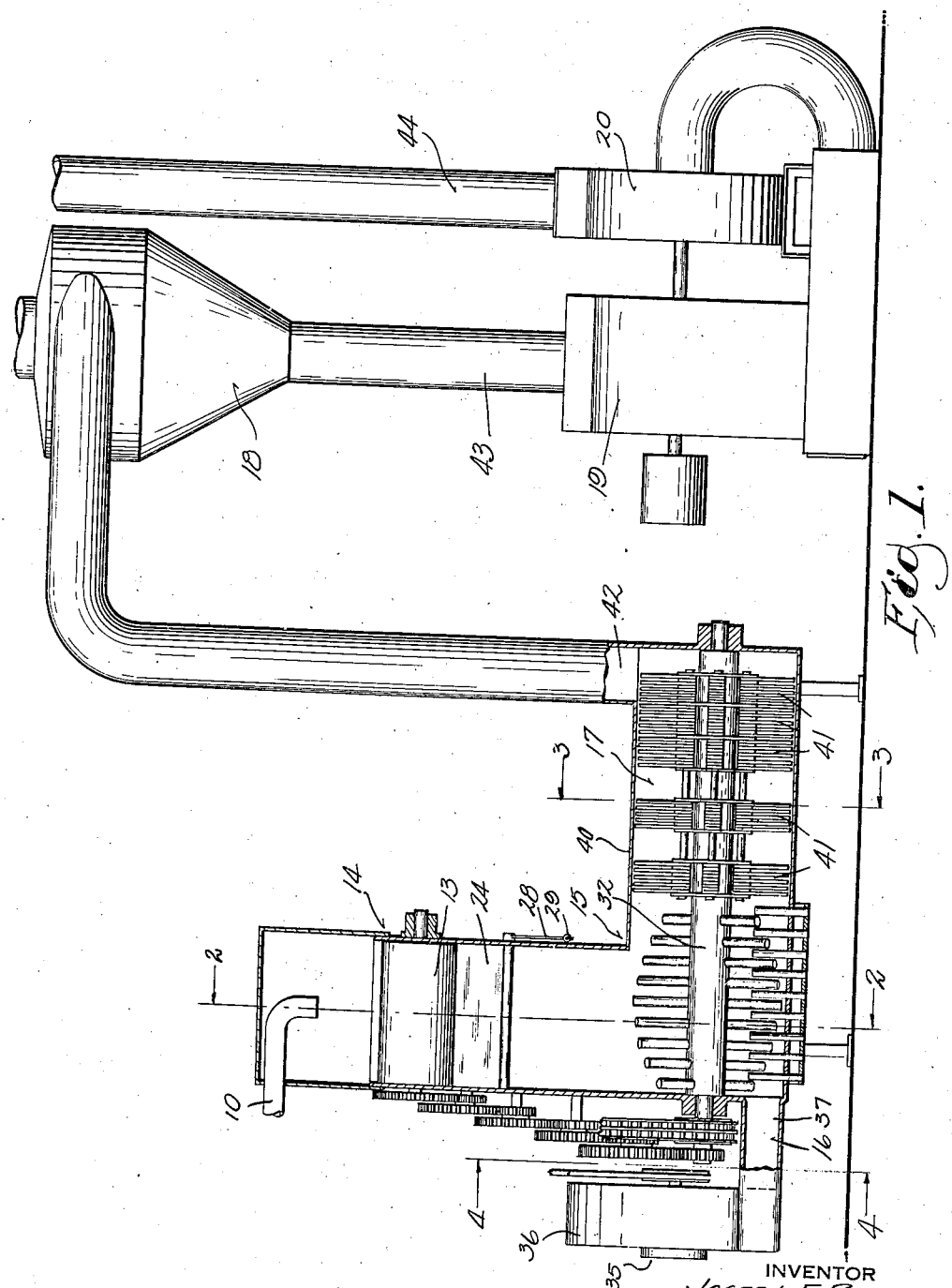

Patented Sept. 19, 1944

2,358,418

UNITED STATES PATENT OFFICE 2,358,418

MACHINE AND A PROCESS FOR MAKING SUGARED MILK POWDER

Joseph E. Rosecky, Menomonee Falls, Wis., assignor to Gehl Guernsey Farms, Inc., Milwaukee, Wis., a corporation of Wisconsin Application November 12, 1941, Serial No. 418,698

9 Claims. (Cl. 99—202)

My invention relates to a machine and a process for making sugared milk powder.

While the machines and processes for making unsweetened dried milk in powdered form have long been known in perfected form, it has not been heretofore practical to produce a sweetened dried milk, especially if a continuous process in a completely enclosed circuit in compliance with modern, commercial, and sanitary methods is maintained. Some of the difficulties heretofore encountered in attempting to successfully meet the requirements included the complete blockading of the mechanical parts of the machines by the sticky mass coming from the concentrators; the excessive power requirements necessary to the breaking up of the drying product; and the difficulty in applying adequate cooling air to the product at certain stages of the treatment.

The object of my invention is to provide a machine and process which will meet the problems to which I have referred above, and among the devices and process steps which I have invented are the following:

Use of rollers to act on raw concentrate and form it into a thin ribbon descending into a closed conduit for initial treatment;

Air cooling of a thin ribbon of concentrated sugared milk in the presence of air borne fine crystals of previously treated and dried products;

Smashing action of a disintegrator applied to the ribbon;

Concentration of air flow in the closed conduit for speed up of the air stream as it leaves the disintegrator;

And other novel steps and devices which will be apparent from the following description.

In the drawings:

Figure 1 is a side elevation of my machine with portions of the casing of my breaker, and beater, and the in-feed mechanism, therefore, broken away in vertical section to show some of the interior parts.

Figure 2 is a section on line 2—2 of Figure 1.

Figure 3 is a section on line 3—3 of Figure 1.

Figure 4 is a section on line 4—4 of Figure 1.

Like parts are identified by the same reference characters throughout the several views.

It may be helpful to an understanding of my drawings, which illustrate my commercial machine, to know that the scale of the drawings is on the basis of three-fourths of an inch equaling one foot.

As is customary in the dried milk art, the raw material to be processed in my machine is the product of vacuum pans or concentrators in which raw milk is concentrated to a degree approximating 90% solids. A particular concentrator with which I have worked delivers the product through a pipe 10 in the form of a viscous, taffy-like stream 11. Because of its sugar content which has been added to the raw milk prior to or during the concentration stage of the raw material, this raw material tends to be excessively sticky. I have not shown the concentrator in my drawing since this equipment is well known in the art.

To assist in the ready understanding of the general structural features of my machine, it will be seen from the drawings that the principal structural elements include feed rolls 12 and 13 in the input housing 14, disintegrator 15, aeration unit 16, mill section 17, separator 18, grader mill 19, and output fan 20.

Fundamentally, of course, the task to be performed by the mechanism generally referred to above and now particularly to be described is that of drying and powdering a raw product which is sticky and moist, and from which evaporation of moisture must be rapidly carried on at the same time that fine division, mechanically, of the treated substance must be accomplished if the process is to be commercially acceptable. Cooling is one of the steps that must be accomplished since the product as it passes from the pipe 10 is at approximately 160 degrees Fahrenheit.

*Input section*

The first step in my process which I carry out in completely enclosed housings and conduits is to pass the warm material 11 between input feed rolls 12 and 13 which form the raw material into a wide compressed ribbon at approximately 160° temperature. This ribbon is thin and, in the machine shown in the drawing, is seldom more than an eighth of an inch thick. I have thus exposed a small amount of raw material in a large surface area in readiness for completion of drying and crystallization. The compression is obtained by means of heavy springs 22 biased against movable bearings 23 at either end of feed roll 12 which is movable to and from input feed roll 13. Feed roll 13 is on fixed bearings.

The input housing 14 surrounding the rolls 12 and 13 has a hood 22 and, since this hood must be removable for inspection and cleaning of the interior of the input housing, it is, therefore, difficult to make an air-tight connection between the hood and the housing 14. I use a pair of scrapers 24 and 25 mounted upon spring-biased pintles 26 and 27 each provided with a spring arm 28 connected by tension spring 29 to cause the scrapers to bear constantly against the feed rolls, and because the scrapers 24 and 25 are fitted tightly to the housing 14 at either end of the scrapers, and the pintles are close to the housing 14, I make it possible to pneumatically close the upper portion of the housing 14 and prevent escape of the rushing quantities of cooling air which are necessary in the next step of my process as the ribbon of raw material passes to the disintegrator section. As illustrated in Figure 2, it will be seen that the scrapers 24 and 25, the feed rolls 12 and 13, and the raw materials between the feed rolls pneumatically close the upper portion of the input section in the housing 14.

The disintegrator section

The ribbon of material 21 to be treated passes from the input feed rolls 12 and 13 by gravity and descends to the disintegrator section 15 shown in longitudinal section in Figure 1 and shown in cross section in Figure 2. This is an important feature of my machine and one of the special reasons for success in my treatment of sugared concentrated milk. In this stage of the treatment of the product, I have tried many forms of construction, such as hammer mills and various other forms of devices for breaking up masses of material. However, such other equipment has failed, to the point of actual blockade of operation of a machine for this purpose.

My disintegrator may be distinguished from a hammer mill in that the hammer mill is an attrition mill characterized by such action and such closely moving parts as to cause generation of heat, whereas my disintegrator smashes the ribbon between spaced stator and rotor bars. Heat generation is negligible. I provide no interacting parts which may be "gummed up" by sticky sugared milk.

My disintegrator includes spaced stator rods 30, and rotor rods 31 which extend through a power shaft 32 disposed axially in my disintegrator section beneath input housing 14. In the rotation of the shaft 32 in the disintegrator section, the rotor rods 31 pass between the stator rods 30, and the ribbon-like material reaching the disintegrator section is "smashed" by the impact and "shredded" or "comminuted" by the rods.

The smashing of the ribbon 21 of treated material is carried on in a turbulent cooling atmosphere. My aeration unit delivers to the disintegrator section large quantities of cooling air drawn through the eye 35 of fan 36 and passed through conduit 37, the cross section of which is illustrated more clearly in Figure 4. It will be noted that the inrush of air through the conduit 37 is applied along the lower-most portion of the housing of my disintegrator. This is of importance, since the effect of the high velocity and great volume of air entering at this point is to circulate and disseminate the finer particles of comminuted material 21 into the higher portions of the housing above the disintegrator section and actually into the zone immediately below the feed rolls. The breaker operation is, therefore, carried on in an atmosphere filled with smaller particles of partially aerated, partially comminuted milk and sugar substance.

While I am not able to fully substantiate my theory of operation of this portion of my machine, the following explanation appears to substantially clarify the steps of my process immediately following the delivery of the raw material 21 through the feed rolls. When a quantity of slightly excessively moist material such as bread dough, partially pulled taffy candy, or similar material is approaching the proper consistency with respect to moisture content, there arises a point or step in the stiffening of the material where the slight addition of flour to the dough or powdered sugar to the taffy will cause an almost instantaneous stiffening or hardening of the product. Something akin to this phenomenon occurs in my process, for when the thin ribbon of raw material enters the chamber above the disintegrator cooling air and dusty granules or crystals of previously dried material are deposited on the sticky surface of the ribbon. The surface loses its tacky characteristics and the dusty accumulation in the lower portion of the disintegrator acts upon the rods 30 and 31 in much the same way that dry flour acts upon a rolling pin in the hands of a baker. No tendency of the material to stick to these rods is noted and the shattering action is accomplished without development of heat.

It is by the aeration along the bottom of the housing of the disintegrator section, the circulation of the partially comminuted material in the upper portions of the housing just below the feed rolls, and the peculiar smashing action of the rotor and stator rods of my mechanism that I have found the key to the successful drying and breaking up of the ribbon 21, for it is a fact that as the comminuted product passes from the disintegrator section to my mill section 17, a most demonstrative change in status and character of the sugared milk as contrasted with the characteristics of the ribbon has taken place.

As indicated above, attempts to operate hammer mills or similar mechanism in the position of my disintegrator 15 have resulted in failure, and, while I am unable with certainty to ascribe a theory or explanation of the difference between my disintegrator operation and that of a hammer mill in this location, I can state that objective differences, such as relative absence of heat in the operation of my disintegrator and an astonishing reduction in power requirements in the operation of my disintegrator, would indicate that attrition methods and accompanying friction must be avoided. An obvious theory is of course, that attrition or hammer mill methods induce sufficient heat in the steps of reducing the size of particles of sugared dried milk so as to form a sticky mass, thus reducing the drying effect of the incoming air and slowing up the process.

As an indication of the commercial success of my mechanism and process, I can state that in equipment of the size herein indicated I am able to continuously operate my mechanism with an input of 1800 pounds per hour, with a total power consumption of 52 horse power, including power required to operate all of the blowers, disintegrators, mills, and transportation conduits above described.

My mill section 17 includes a tubular extension 40 of the disintegrator housing 15. The power shaft 32 is provided with the conventional beaters 41 of a hammer mill and the partially smashed and comminuted material 21 is reduced thereby to a degree of fineness satisfactory for pneumatic transmission through output conduit 42. This conducts the volume of air and product to separator 18 where the product is separated and permitted to descend by gravity through conduit 43 into hammer mill 19. There the product is sufficiently milled to reduce it to commercially satisfactory size as powdered sugared milk. From the hammer mill 19, the product is drawn off through conduit 44 and output fan 20 to storage bins or other places for ultimate commercial disposal.

The required speed of operation of the parts appears to be fairly critical. I operate the shaft 32 at approximately 1150 revolutions per minute and the feed rolls at peripheral speed of 12 feet per minute. The rotor rods have clearance for free rotation in the housing 15 which is 22 inches in diameter.

The quantity of air forced by the aeration unit into the lower part of the disintegrator section is only sufficient to carry the comminuted material through to the separator 18. An air pressure of 2 and ⅞ ounces per square inch is adequate in a machine of the size here described. It provides sufficient turbulence to process the ribbon 21.

I claim:

1. The process of manufacturing sugared, dried milk powder which includes the introduction of sugared milk concentrated to approximately 90% solids into an enclosure in a stream exposed in free space out of contact with said enclosure and in the presence of turbulent atmosphere bearing particles of previously dried sugared milk, introducing into said enclosure a drying gas for the further dehydration of the concentrated sugared milk, the turbulent atmosphere comprising said drying gas coating the concentrated sugared milk with said particles while said milk remains in free space substantially out of contact with said enclosure whereby to render the surface of such milk non-adherent and to render the concentrated frangible, disintegrating the concentrated product in a disintegrator in said atmosphere to break the frangible material, powdering the broken material by attrition process and separating the powdered material from the air stream.

2. The process of manufacturing sugared, dried milk powder which includes the steps of forming concentrated sugared milk having approximately 90% solids into a ribbon, exposing the ribbonlike material to a turbulent cool atmosphere, disintegrating such material and powdering the disintegrated material by an attrition process.

3. In a machine for producing powdered, sugared, dried milk, a housing provided with feed rolls for reception of concentrated product therebetween for delivering a thin stream of such product vertically downwardly from said rolls, a disintegrator in the housing disposed a substantial distance below said rolls to receive the concentrated product through free space from the feed rolls, said disintegrator comprising a set of laterally spaced bars and a second set of rotatably mounted bars staggered with respect to the bars of the first set to pass therebetween, and means for actuating the set of rotatable bars, a hammer mill to receive the product from the disintegrator, and an air blower having an outlet for an air stream directed to the disintegrator and to the feed rolls whereby to create a turbulent atmosphere about the disintegrator and carry particles of product toward the feed rolls, said outlet being also directed to pass comminuted product from the disintegrator to the hammer mill.

4. In a device of the character described, a walled horizontal enclosure and a vertical extension thereof at one end thereof, feed rolls positioned to block the upper end of the vertical extension and positioned to receive concentrated sugared milk and form it into ribbon shape for descent in said vertical extension, a shaft axial of said horizontal enclosure, rotor rods extending from said shaft and stator rods extending from the walls of the enclosure to comprise a disintegrator positioned to receive the ribbon-like concentrate from the said rolls, hammer mill mechanism adjacent said disintegrator in the enclosure, and a blower for directing an air stream into said housing adjacent the disintegrator whereby to create a turbulent atmosphere adequate to place in suspension finely divided portions of said ribbon broken by the disintegrator, and an outlet for the housing at such a point spaced from the disintegrator as to position the hammermill between the disintegrator and said outlet, said outlet providing for delivery of the product on the air stream from said blower and from said hammer mill.

5. In a device of the character described, a walled horizontal enclosure and a vertical extension thereof at one end thereof, feed rolls positioned to block the upper end of the vertical extension and positioned to receive concentrated sugared milk and form it into a ribbon shape for descent in said vertical extension, a shaft axial of said horizontal enclosure, rotor rods extending from said shaft and stator rods extending from the walls of the enclosure to comprise a disintegrator positioned to receive the ribbon-like concentrate from the said rolls, hammer mill mechanism on said shaft adjacent said disintegrator in the enclosure, and a blower for directing an air stream into said housing adjacent the disintegrator whereby to create a turbulent atmosphere adequate to place in suspension finely divided portions of said ribbon broken by the disintegrator, and an outlet for the housing at such a point spaced from the disintegrator as to position the hammermill between the disintegrator and said outlet, said outlet providing for delivery of the product on the air stream from said blower and from said hammer mill.

6. A process of the character described, which includes the delivery of concentrated sugared milk comprising approximately 90% solids at a temperature of approximately 160 degrees in the shape of a ribbon into a relatively cool atmosphere turbulated and carrying small particles of previously dried and comminuted product, disintegrating the ribbon shaped milk in a disintegrator in said atmosphere, and powdering the broken product by an attrition process.

7. In a device of the character described, a substantially airtight housing having an input opening and a blower connected to the housing for supplying air pressure therein, rolls supported in said housing to occupy substantially the area of said input opening, one of said rolls being adjustably mounted with respect to the housing and provided with a spring biasing the feed roll toward another of said rolls, scraper blades mounted upon pintless adjacent the walls of the housing and positioned to bear upon respective rolls, said blades and said rolls being shaped whereby in all positions of the movable roll to constitute a partition across the housing.

8. The process set forth in claim 2 in which the drying of the ribbon is facilitated by dusting the ribbon of concentrated sugared milk material with previously dried powdered of the same material, prior to disintegrating the material of the ribbon.

9. The process set forth in claim 2 in which the ribbon is suspended in free space and said turbulent cool atmosphere is confined about the ribbonlike material, the material being simultaneously coated with the dust of previously powdered like material.

JOSEPH E. ROSECKY.